A. S. KROTZ.
VEHICLE DRIVING AND BRAKING MEANS.
APPLICATION FILED DEC. 16, 1908.
1,021,197.
Patented Mar. 26, 1912.
2 SHEETS—SHEET 1.
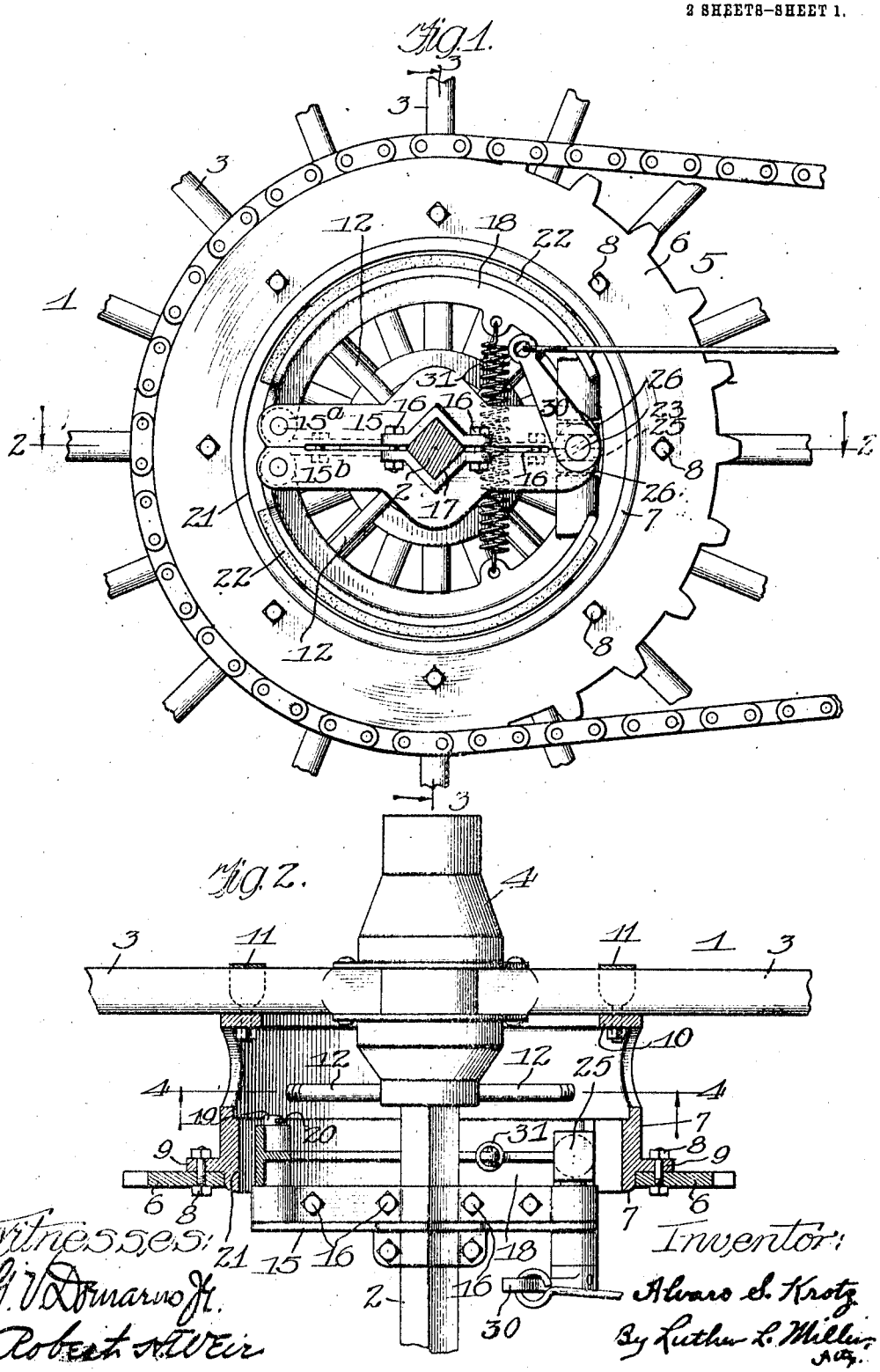

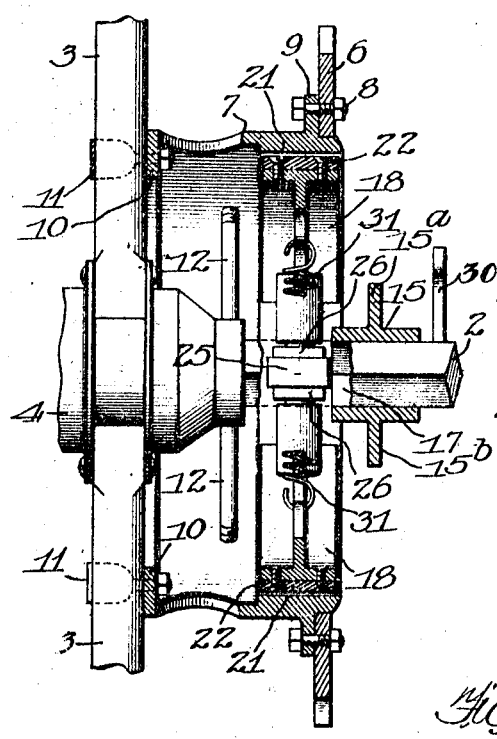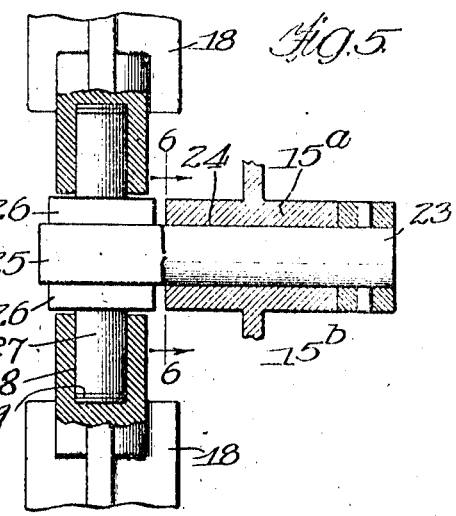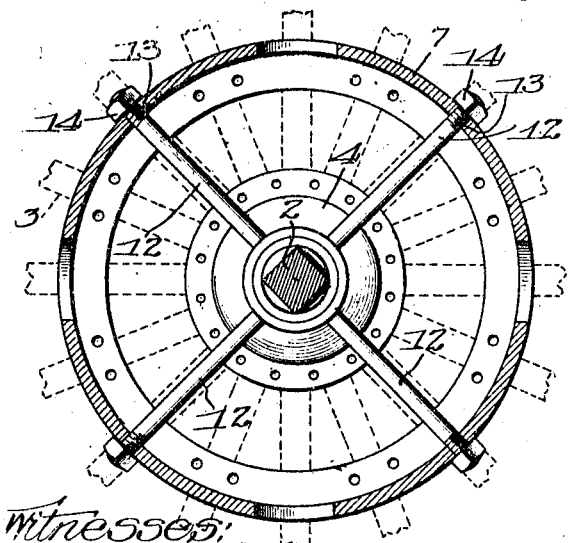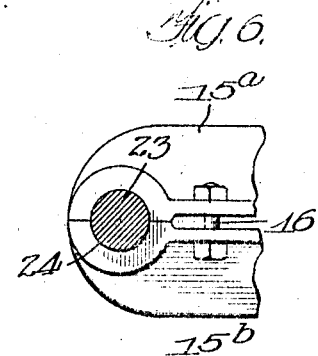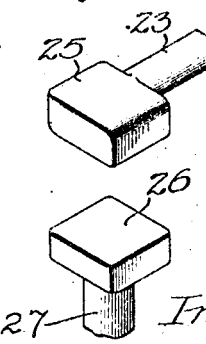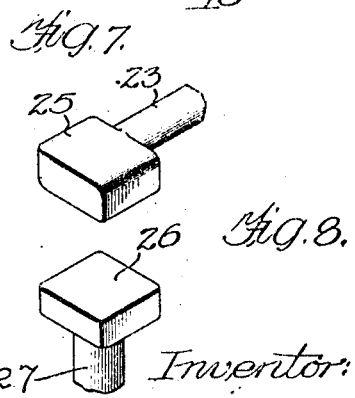

UNITED STATES PATENT OFFICE.

ALVARO S. KROTZ, OF CHICAGO, ILLINOIS, ASSIGNOR TO SEARS, ROEBUCK & COMPANY, OF CHICAGO, ILLINOIS, A CORPORATION OF NEW YORK.

VEHICLE DRIVING AND BRAKING MEANS.

1,021,197.  Specification of Letters Patent.  Patented Mar. 26, 1912.

Application filed December 16, 1908. Serial No. 467,864.

*To all whom it may concern:*

Be it known that I, ALVARO S. KROTZ, a citizen of the United States, residing at Chicago, in the county of Cook and State of Illinois, have invented certain new and useful Improvements in Vehicle Driving and Braking Means, of which the following is a specification.

One of the objects of this invention is to provide improved means for attaching a sprocket wheel or similar driving element to a vehicle wheel.

Another object is to produce an improved braking mechanism for vehicles.

A further object is to combine a braking apparatus and a sprocket wheel or similar driving element into a simple, compact structure that may be readily applied to a vehicle.

In the accompanying drawings Figure 1 is an elevation of a structure embodying the features of my invention, the view being taken from the inner side of the vehicle wheel to which the invention is shown as applied. Fig. 2 is a sectional view taken upon the plane of line 2 2 of Fig. 1. Fig. 3 is a section on line 3 3 of Fig. 1. Fig. 4 is a section on line 4 4 of Fig. 2. Fig. 5 is a detail view illustrating a means for moving the brake shoes into braking position, and an adjusting means. Fig. 6 is a section on line 6 6 of Fig. 5. Fig. 7 is a perspective view of the cam or member employed to throw the brake shoes into operative position. Fig. 8 is a perspective view of one of the parts directly engaged by said cam.

The embodiment which has been selected for illustration comprises a vehicle wheel 1 rotatably mounted upon an axle 2, said wheel comprising spokes 3 and a hub 4. Fixed to the wheel 1 in a position concentric with its axis is a sprocket wheel 5 which in this instance comprises a toothed annular ring 6 and a cylindrical attaching portion 7 to which said ring is secured by means of bolts 8 or in any other suitable manner, said bolts passing through said ring and a flange 9 on said attaching portion. The toothed ring 6 being removably secured to the attaching portion 7, the toothed portion may be readily renewed or the size of the sprocket wheel changed by removing the ring 6 and substituting another ring therefor.

The means herein shown for securing the cylindrical attaching portion 7 to the wheel comprises an annular, inwardly extending flange 10 upon said attaching portion, which flange is secured to any suitable number of spokes 3 by means of clips 11. The sprocket wheel 5 is centered upon the vehicle wheel by means herein shown as pins or studs 12 bearing at their inner ends upon the periphery of the inner end of the wheel hub, the outer ends of said studs being screw-threaded and engaging in screw-threaded openings 13 (Fig. 4) in the portion 7. The studs 12 are provided with lock nuts 14.

Power applied to the sprocket wheel 5 to rotate the vehicle wheel 1 is transmitted to the latter through the clips 11, while stresses tending to pull the wheel forward are transmitted to it principally through the studs 12. It will thus be seen that power may be applied to the vehicle wheel without racking or straining it. After the sprocket wheel has been adjusted in position upon the vehicle wheel, said sprocket wheel may be removed by releasing the clips 11, and without disturbing the adjustment of the studs 12. It will therefore be apparent that the sprocket wheel may be replaced upon the vehicle wheel and secured to the latter in proper concentric position by merely engaging the clips 11 with the spokes of the wheel. It will be seen that the clips 11 engage the spokes at points removed from the hub 4, whereby an advantageous leverage is secured upon the wheel.

The braking mechanism comprises a supporting arm 15, herein shown as rigidly mounted upon the axle 2 and comprising two complementary sections 15$^a$ 15$^b$ secured together by means of bolts 16. The arm-sections form between themselves a socket 17 conforming to the cross-sectional form of the axle 2, the latter in this instance being represented as of square cross-section, whereby the support 15 is prevented from turning with relation to said axle. Two similar brake shoes 18, each curved upon the arc of a circle, of substantially 180 degrees, are pivotally mounted upon the support 15. As herein shown, each section of said support has at one end a stud 19 (Fig. 2) upon which one of said brake shoes is pivoted, a cotter pin or equivalent device 20 securing the brake shoe against displacement from its pivot. The brake shoes 18 are adapted to engage the inner cylindrical surface 21 of the sprocket-wheel structure, each shoe being preferably provided with a covering of suitable friction material 22.

The means herein shown for moving the brake shoes 18 into and out of contact with the surface 21 comprises a shaft 23 rotatably mounted in a bearing opening 24 formed in the support 15. Upon one end of said shaft, and preferably integral therewith, is a cam portion 25 lying between the free ends of the brake shoes 18. Each of said brake shoes is provided with a member 26 to lie in contact with the cam 25, said member having a stem 27 extending into a recess 28 in the brake shoe. The member 26 is adjusted with relation to the brake shoe by inserting one or more washers 29 between the end of said stem and the bottom of the recess. It will be observed that the parts upon which wear occurs in practice, to wit, the parts 25 and 26, are small, may be made of hardened metal, and may be readily renewed.

The shaft 23 is rocked to throw the brake shoes 18 into frictional engagement with the surface 21 by any suitable means, such as a crank arm 30 fixed to one end of said shaft. Said crank arm may be arranged to be controlled from any desired point in any preferred manner. A coiled spring 31 attached at its ends to the brake shoes 18 intermediate the ends of said shoes, tends to move said shoes out of operative position. Said spring by placing pressure upon the brake shoes also serves to prevent said shoes from rattling on their pivotal supports 19 and at their free ends.

The brake is operated by swinging the crank arm 30, the cam 25 upon said shaft forcing the members 26 apart and thereby moving the brake shoes 18 into frictional engagement with the surface 21. When the crank arm 30 is released, the spring 31 immediately withdraws the brake shoes 18 from engagement with the surface 21.

I would have it understood that I desire not to be limited to the details of construction herein shown and described, for various modifications will occur to persons skilled in the art.

I claim as my invention:

The combination, with a vehicle wheel and an axle, of a braking mechanism for said wheel comprising a brake drum fixed to said wheel, a support consisting of two similar complementary sections forming between them a socket for the axle, means for securing said sections together and clamping them upon the axle, two brake shoes each hinged at one end to one end of one of said sections and adapted to bear against the inner surface of said drum, a shaft mounted in a socket formed between the ends of said sections opposite to the ends bearing the shoes, a cam on said shaft adapted to engage said shoes to move them into contact with the drum, means for rocking said shaft, and means for moving said shoes out of contact with the drum.

ALVARO S. KROTZ.

Witnesses:
  WALTER L. HUDSON,
  GEORGE L. CHINDAHL.